Oct. 21, 1941.                L. BOOR                2,260,208
                      ADJUSTABLE FILTER HOLDER
                         Filed May 10, 1940
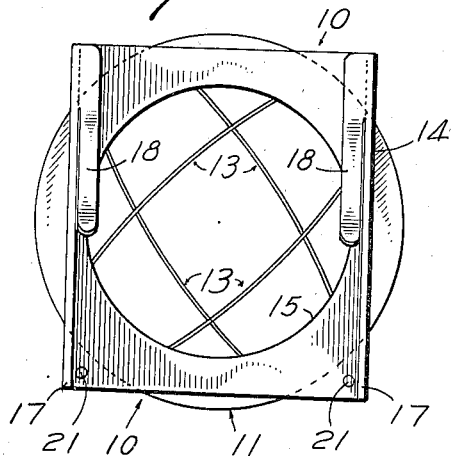
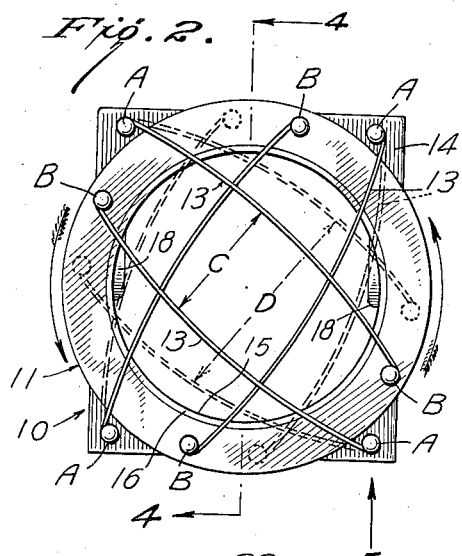
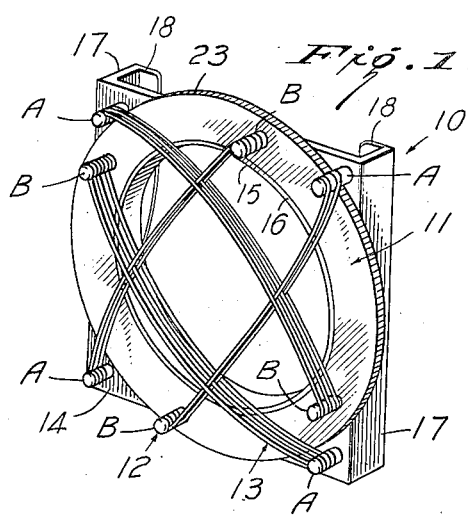
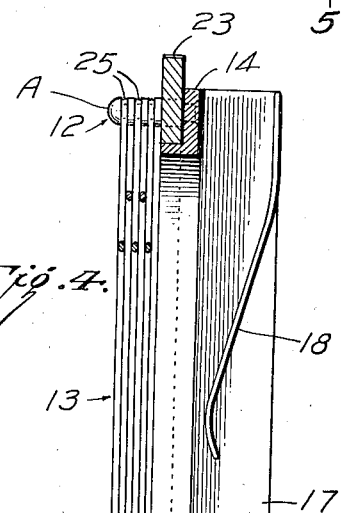
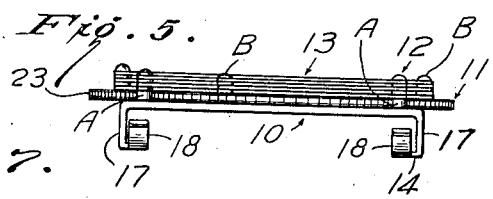
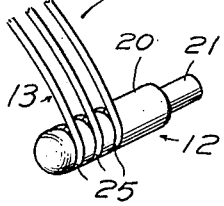
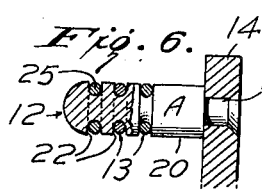
INVENTOR
LADISLAV BOOR,
BY
ATTORNEY.

Patented Oct. 21, 1941

2,260,208

UNITED STATES PATENT OFFICE 2,260,208

ADJUSTABLE FILTER HOLDER

Ladislav Boor, New Canaan, Conn.

Application May 10, 1940, Serial No. 334,334

3 Claims. (Cl. 95—81)

The present invention relates to article holders in general and more particularly to a filter support used in connection with photographic cameras or the like.

Photographic filters are highly desirable, and frequently necessary, in order to obtain certain corrections in the photographic effect of various colors on photographic negatives.

Light filters of this general type are usually formed of transparent material such as glass or gelatine, and are placed in front of the photographic lens so that the light passing through the lens is altered according to the characteristics of the particular filter employed. It is a well-known fact that not only do various subjects require filters of predetermined shades, but the same subject may require different filters due to an altered light source. Hence frequent and easy changes of light filters may be found desirable.

One of the principal objects of my invention, therefore, resides in an extremely simple and highly effective device which may be readily attached to and removed from lens barrels of various diameters and manufacture.

Another object of the invention is to provide novel spring tension means for firmly gripping the lens barrels to which the device is attached, pressure of the tension means being so uniformly distributed about the circumference of the lens barrel as to minimize any possibility of accidental displacement therefrom.

Still another object is to provide a filter holder provided with means for easily and quickly changing the filter.

Additional objects and advantages of this invention will be further described and illustrated by the accompanying drawing and the following description illustrative of the preferred embodiment thereof and of the preferred construction and operation. It should be clearly understood, however, that I do not limit myself to the precise form of device shown in the drawing and described below since the invention may take other forms differing in details, but operating on similar principles and accomplishing its results in substantially the same manner.

In the accompanying drawing:

Figure 1 illustrates a preferred construction and an embodiment of the invention, in perspective;

Figure 2 is a front elevation;

Figure 3 is a rear view thereof;

Figure 4 illustrates a vertical sectional view on an enlarged scale taken on the line 4—4 of Figure 2, looking in the direction of the arrows;

Figure 5 shows a bottom edge view, or as looking in the direction of the arrow 5 in Figure 2;

Figure 6 is a detail sectional view, partly in elevation of one of the studs, and Figure 7 illustrates one of the studs in perspective.

My invention in the form or embodiment shown in the drawing and briefly described comprises an article holder indicated generally as 10, comprising a ring 11 revolubly mounted thereon, a plurality of pins 12, and spring wires 13.

In order to permit my novel article holder to be applied to a great number of various devices such as cameras, telescopes, pyrometers, optical equipment in general, etc. I prefer to construct the body portion in the form of a rectangular frame 14 having a substantially large central opening 15 terminating in a laterally-formed and forwardly extending cylindrical portion or ledge 16. Extending in a rearwardly direction and integrally formed on the frame 14 I provide a pair of parallel and vertical flanges or side walls 17. A spring clip 18 is provided at the upper end of each of the side walls 17 for a purpose to be hereinafter described.

Each of the pins indicated generally as 12 and illustrated in detail in Figures 6 and 7 is formed in substantially the same manner and consists of a body portion 20, a reduced shank portion 21 and a plurality of grooves 22.

For the sake of clarity, I shall designate the relatively stationary pins 12 as A, and the pins which are associated with the revoluble ring 11 as B. The pins A, it will be noted from the accompanying drawing, are located in each of the four corners of the rectangular frame 14 to which they are securely riveted, as clearly shown in Figures 4 and 6.

The ring indicated generally at 11 is fitted with respect to the annular flange 16 of the frame 14 so as to have free rotative movement therearound, and the thickness of this ring is substantially the same as the length or the protrusion of the cylindrical ledge 16 as is clearly indicated in Figures 1 and 4. The outer and circular edge of the ring 11 is preferably knurled as indicated at 23 so that it may be firmly gripped during its manipulation.

Two pairs of pins B which are associated with the ring 11 are riveted or secured to it in substantially the same manner as are the two pairs of pins A already described in connection with the frame 14.

The important feature of my invention resides in the plurality of sets of superimposed spring wires arranged in such a novel manner as to be under constant tension so as to permit the article holder to be readily attached to a great number of various-sized devices such as lens barrels or the like. It will be seen by referring to Figure 2, that by rotating the ring 11 in a counterclockwise direction, or as indicated by the arrows, the pins B carried by the ring 11 deflect the superimposed spring wires 13 so as to increase the space between the wires. This variance I have indicated by the solid dimension line C and the dotted dimension line D.

The spring wires 13, it will be noted, are arranged in two groups, one group having three wires and the other group two wires, and preferably interspaced. Since the end of each wire in all of the groups is formed in a loop 25, and extended around the groove or reduced neck portion 22 of its respective pin, by reason of the fact that the wires are slightly curved and by reason of the fact that the wires of one set are interspaced with respect to two other sets, the dislocation or accidental displacement of these wires is effectually prevented.

It will now be readily understood that my novel article holder may be readily applied to a camera or any other device by merely oscillating the ring 11 and permitting it to return to its gripping position by means of the spring wires, the article to be supported being adapted to be inserted between the side walls 17 and held in place against displacement by means of the spring tension members 18.

It may be here stated that instead of employing four sets of superimposed spring wires, three or more sets may be employed, depending upon the diameter of the wires or the size of the article to be supported.

Although I am aware of the existence of devices of this general nature, yet I know of no instance of an article holder which may be as readily applied or removed from its support, which will hold it in its proper alignment therewith with the minimum amount of slippage or displacement.

Various changes may be made in the details of my invention without departing from the spirit and scope thereof as defined in the appended claims.

What I claim is:

1. In combination, an article holder, a revoluble member mounted thereon, and a plurality of sets of springs, one end of each spring being supported by the holder and the other end of each of said springs being supported by the revoluble member, the wires of one of the sets of springs being interspaced by the wires of another set of springs.

2. An article holder comprising a relatively stationary frame having a pair of side walls extending rearwardly and a cylindrical ledge on the opposite face thereof, a ring revolubly mounted on said cylindrical ledge, pins having a plurality of grooves secured to said stationary frame, a second set of pins substantially formed as the first-named pins carried by the revoluble ring, and a plurality of spring wires connected between each of the first-named pins and each of said pins carried by the ring.

3. An article holder as set forth in claim 2 in which the wires of one of the sets of springs are interspaced by the wires of an adjacent set of springs.

LADISLAV BOOR.